Patented Aug. 30, 1932

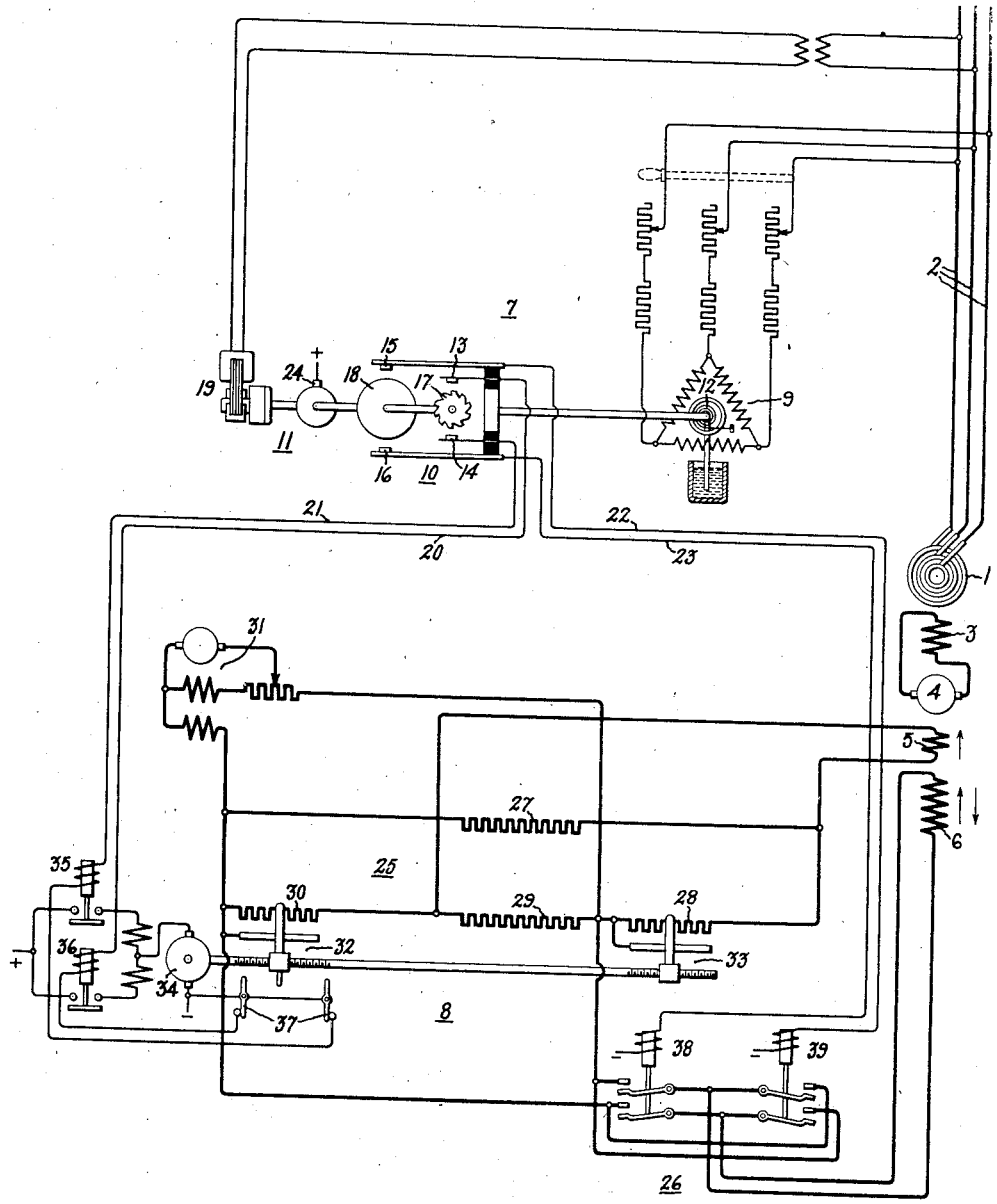

1,875,280

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

ELECTRICAL REGULATOR

Application filed September 24, 1931. Serial No. 564,881.

My invention relates to electrical regulators and more particularly to electrical regulators of the type which are provided with means for producing relatively large and sudden increases in the quantity to be regulated in addition to the usual means for securing ordinary regulation in response to variations in a condition to be regulated.

In my Patents No. 1,848,852 granted March 8, 1932, and No. 1,849,813 granted March 15, 1932, and in my copending application, Serial No. 538,508, filed May 19, 1931, all of which are assigned to the assignee of the present application, are disclosed various regulating arrangements of the abovementioned type. The present invention, while making use of a number of the features of my above referred to disclosures, differs therefrom primarily in the means for securing relatively sudden and large changes in the regulated quantity or condition. This means consists essentially of a normally de-energized auxiliary field winding, which will be referred to throughout the specification as a forcing field winding, which is arranged selectively to aid or oppose the action of a normally energized field winding, which will be referred to as the regulating field winding, during abnormal conditions. Such an arrangement has the advantage that it has very low losses due to the fact that the forcing field winding is normally de-energized and consequently no power is normally being wasted in a regulating resistance for this winding.

It has been found that there are many cases in which it is desirable and necessary to provide an automatic electrical regulator with automatic forcing means for not only producing rapid increases in dynamo electric machine excitation but also for producing equally rapid decreases in excitation. The rapid increases are necessary at times when sudden loads are applied to a system whose voltage, for example, is being regulated. Due to the sudden application of load, as by a short circuit or by other switching operations on the system, the system voltage often tends to fall to such low values as to impair seriously the stability of the system. Consequently it is necessary to provide forcing means or other quick acting means for rapidly returning the system voltage to normal. The means for rapidly decreasing excitation becomes important in arrangements where a synchronous condenser is acting to regulate the voltage of a transmission system having a relatively high charging current, or where water wheel driven generators are connected to transmission lines having relatively high charging currents. In such cases if the load on the system should become suddenly disconnected there will be a sudden large increase in system voltage, which in the synchronous condenser case is due to the fact that the leading current taken by the condenser while it is holding up the voltage of the system when flowing through the transmission line will result in a large rise in voltage, while in the case of the water wheel driven generator the inherent tendency of the prime mover to increase its speed when the load is removed coupled with the fact that a high charging current line when it is opened at the load end will almost entirely excite the alternating current generator connected thereto without any auxiliary field excitation, causes a very large increase in transmission line voltage.

An object of my invention is to provide a new and improved electrical regulating arrangement.

Another object of my invention is to provide novel and economical excitation forcing means in electrical regulating systems.

My invention will be better understood from the following description taken in connection with the accompanying drawing and its scope will be pointed out in the appended claims.

Referring now to the single figure of the accompanying drawing, wherein is diagrammatically illustrated an embodiment of my invention as applied to regulating the voltage of an alternating current synchronous generator 1, which is connected to a three-phase transmission circuit 2. Although the two field windings of my regulator might be arranged to act directly on the alternating current generator 1, I prefer to have them operate on an exciter and consequently I provide generator 1 with a single main field winding 3 which is energized from an exciter 4 which in turn has a main or regulating, field winding 5 and an auxiliary normally deenergized forcing winding 6.

The regulating means for controlling windings 5 and 6 may be divided into two main parts, namely a regulator head 7 and control means 8 consisting of a regulating resistance and suitable control relays and other operating means, under the control of the head 7. The regulator head 7 comprises a condition responsive force producing device, which in the illustrated embodiment, consists of a three-phase torque motor 9; a contact arrangement 10, arranged to be operated by the motor 9; and an anti-hunting assembly 11 for cooperating with the contacts of 10. The torque of motor 9 is opposed by a spring 12 and this motor is so arranged that the torque is exactly balanced by the spring 12 when the voltage of circuit 2 is normal, while when the voltage exceeds normal, the motor torque, which is counterclockwise, overcomes the torque of spring 12 and causes the contact assembly 10 to move downwardly whereas when the voltage is below normal the spring 12 overcomes the torque of the motor 9 and the contact assembly 10 moves upwardly. I prefer to employ a three-phase condition responsive element such as the torque motor 9 because such an element not only responds to balanced variations in the voltage of circuit 2 but also to unbalanced variations such as single phase variations in the voltage. Contact assembly 10 carries a pair of resiliently mounted contacts 13 and 14 and a pair of relatively rigidly mounted contacts 15 and 16. Contacts 13 and 15 are what will be referred to as the lower contacts as they control the elements of the regulator for lowering the excitation of the exciter 4 and consequently the voltage of the generator 1 and circuit 2. Similarly contacts 14 and 16 are what will be referred to as the raise contacts as they control the elements of the regulator for raising the voltage. Contacts 13 and 14 control the relatively slow acting regulating means for controlling regulating winding 5 while contacts 15 and 16 control the relatively quick acting means for controlling the polarity and energization of the forcing field winding 6. The anti-hunting assembly 11 comprises a cam or star wheel 17, a smooth contact wheel 18 and a suitable source of rotation for turning these wheels, such for example as a small synchronous motor 19 of the type used for driving electric clocks, which is connected to be energized from one of the phases of circuit 2. The arrangement of these elements is such that when the voltage of circuit 2 is normal none of the contacts 13, 14, 15 or 16 are in engagement with their respective cooperating rotating contact wheels while if the voltage of circuit 2 increases or decreases slightly contacts 13 and 15 engage cam wheel 17 respectively thereby intermittently completing certain operating circuits. As the departure from normal of the voltage increases the pressure of these resiliently mounted contacts on the wheel 17 increases thereby varying the ratio of the time of engagement to the time of disengagement of these contacts with the wheel 17. When the departure from normal exceeds predetermined limits, contacts 15 or 16 engage smooth wheel 18 thereby controlling circuits for the operation of forcing winding 6. The details of this regulator head form no part of the present invention and are disclosed in detail and claimed in my previously referred to Patent No. 1,848,852.

Contacts 13, 14, 15 and 16 are connected respectively to control circuits 20, 21, 22 and 23. These control circuits are all connectable to the positive side of any suitable source of control current, through their respective contacts, by means of a brush 24 on the anti-hunting assembly 11. This brush is electrically connected to the positive side of a source of control current.

The means 8 for controlling the field windings 5 and 6 in response to the operation of the regulator head 7 consists essentially of a Wheatstone bridge type regulating resistance 25, for controlling the regulating winding 5 in response to the action of contacts 13 and 14; and electro-responsive polarity reversing means 26 for controlling the direction of energization of the normally deenergized forcing winding 6 in response to the action of the forcing contacts 15 and 16. Bridge 25 comprises four resistances 27, 28, 29 and 30 of which the two electrically non-adjacent resistances 28 and 30 are made adjustable whereby the balance of the bridge may be controlled. The bridge is energized by means of any suitable source of direct current such, as a sub-exciter 31 which is connected to electrically opposite points in the bridge while the regulating winding 5 is connected to the remaining two electrically opposite points of the bridge. By means of this arrangement very small changes in the values of resistances 28 and 30 will cause relatively large changes in the effective resistance value of the bridge as a whole and consequently will cause relatively wide variations in excitation of winding 5. The values of resistances 28 and 30 are controlled by rheostatic means 32 and 33 which are operated by a reversible pilot motor 34. This pilot motor is controlled by a pair of relays, or contactors, 35 and 36 which are controlled respectively by circuits 21 and 20 which in turn are controlled respectively by the raise and lower contacts 14 and 13 respectively. The circuits for relays 35 and 36 are completed through limit switches 37, associated with rheostatic means 32 and thence to the negative side of the supply source. Similarly, the energizing circuits for motor 34 lead from the negative side of the supply source through its armature, one or the other of its field windings, the contacts of relays 35 or 36 to the positive side of the supply source.

The polarity reversing means 26 may take any one of a number of alternative forms, and in the illustrated embodiment it is shown as a pair of normally open relays, or contactors, 38 and 39 controlled respectively by circuits 23 and 22. As shown these relays 38 and 39 are arranged to connect forcing winding 6 directly to sub exciter 31 and depending upon which of these relays is actuated, the polarity of winding 6 may be reversed.

The operation of the above described arrangement is as follows:

When machines 1, 4 and 31 are operated and the voltage of circuit 2 is normal the parts will all be in the positions shown in the drawing. If now relatively small variations in voltage take place the torque motor 9 will cause contact assembly 10 to move up or down depending upon how the voltage has changed thereby causing engagement of contacts 14 or 13 with star wheel 17. This will cause intermittent operation of relays 35 or 36 whereby motor 34 is intermittently operated to cause rheostatic means 32 and 33 to vary the values of resistances 28 and 30. This will control, or vary, the balance of the bridge 25 and consequently will control the amount of current in the field winding 5. In this manner the energization of field winding 5 is automatically controlled in response to the voltage of circuit 2 in such a manner as to tend to hold this voltage substantially constant. If now there should be relatively large changes in the voltage of circuit 2, as by the application of sudden loads or short circuits to the circuit 2, which would cause sudden decreases in voltage, or because the load is entirely lost, which would cause relatively large and sudden increases in voltage, the torque of motor 9 would vary so greatly as to cause engagement of contacts 16 or 15 with wheel 18. This would cause energization of either relays 38 or 39 whereby forcing field winding 6 would be energized. In the case of a generator, this arrangement would be such that if the voltage of circuit 2 became too high contact 15 would engage contact 18 thereby energizing circuit 22 and relay 39 which would so connect forcing winding 6 to sub exciter 31 as to cause this winding to oppose the action of the regulating winding 5 thereby to suddenly reduce the net excitation of the exciter 4. Similarly if the voltage of circuit 2 should fall to dangerously low values the contact 16 would engage contact 18 thereby completing energizing circuit 23 for relay 38 with the result that field winding 6 would be reversely energized and would thus act to aid the action of the regulating winding 5.

While I have shown and described the particular embodiment of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, a dynamo electric machine having separate respectively normally energized and deenergized field windings, means for varying the energization of said normally energized field winding in accordance with variations in the value of a condition to be regulated, and means for causing relatively opposite energization of said normally deenergized field winding in accordance with whether said condition is a predetermined amount above or below a normal value.

2. In combination, a dynamo electric machine having two field windings, regulating means controlling the energization of one of said windings in a manner tending to maintain an operating condition at a substantially normal value, said regulating means acting in response to predetermined increases or decreases of said condition from said normal value for causing rapid and large increases in the excitation of the other field winding, said increases being arranged to cause said last mentioned field winding to aid or oppose said first mentioned field winding depending upon the direction in which said condition departs from its normal value.

3. In combination, a dynamo electric machine, an exciter therefor, a pair of field windings for said exciter, a regulating resistance connected in series with one of said field windings, normally open polarity reversing circuit controlling means connected to the other field winding, regulating means for varying the value of said regulating resistance in accordance with an operating condition, said means also controlling said polarity reversing means in accordance with the value of said operating condition.

4. In combination, a dynamo electric machine, an exciter therefor, two field windings for said exciter, a regulating resistance in the form of a Wheatstone bridge connected to one of said field windings, pilot motor operated means for varying the balance of said bridge, electroresponsive polarity reversing circuit controlling means connected to the other field winding in a manner to maintain this field winding normally deenergized, voltage regulating means for said dynamo electric machine arranged to control the direction of operation of said pilot motor in accordance with relatively small deviations from a normal value of the voltage of said machine, said regulating means acting on relatively large deviations in voltage from said normal value to cause said electroresponsive means to energize the normally deenergized field winding in a manner to cause it to aid or oppose the other field winding depending upon the direction of the relatively large voltage deviation.

In witness whereof, I have hereto set my hand.

LOUIS W. THOMPSON.